United States Patent
Aoki

(10) Patent No.: US 7,760,404 B2
(45) Date of Patent: Jul. 20, 2010

(54) IMAGE PROCESSING DEVICE

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1225 days.

(21) Appl. No.: 10/898,985

(22) Filed: Jul. 27, 2004

(65) Prior Publication Data
US 2005/0041262 A1    Feb. 24, 2005

(30) Foreign Application Priority Data
Jul. 28, 2003    (JP)    ............... 2003-281056

(51) Int. Cl.
  *H04N 1/04*    (2006.01)
  *H04N 1/00*    (2006.01)
  *H04N 1/047*    (2006.01)
(52) U.S. Cl. .................. 358/488; 358/406; 358/474; 382/318; 382/319
(58) Field of Classification Search ............ 358/400, 358/401, 405, 406, 409, 448, 474, 488, 500, 358/501, 504, 505, 530; 382/318, 319
See application file for complete search history.

(56) References Cited

U.S. PATENT DOCUMENTS 5,233,168 A * 8/1993 Kulik .................. 235/456
5,373,371 A * 12/1994 Masui ................. 358/444
5,585,926 A   12/1996 Fujii et al.
5,604,601 A * 2/1997 Edgar et al. ............ 358/302
5,764,383 A * 6/1998 Saund et al. ........... 358/497
6,381,043 B1 * 4/2002 Tsai et al. ............. 358/488
6,807,320 B1  10/2004 Sawada

FOREIGN PATENT DOCUMENTS

| JP | A 4-35155 | 2/1992 |
| JP | A 5-161003 | 6/1993 |
| JP | A 6-205176 | 7/1994 |
| JP | 2001-103273 A | 4/2001 |
| JP | A 2002-10039 | 1/2002 |

* cited by examiner

*Primary Examiner*—King Y Poon
*Assistant Examiner*—Lawrence E Wills
(74) *Attorney, Agent, or Firm*—Oliff & Berridge, PLC

(57) ABSTRACT

An image processing device is provided with a reference position determining system that determines a reference position based on image data of an original, an image scanning system that scans the original line by line, the line extending in a main scanning direction, an image storing system that stores a predetermined number of lines of image data scanned by the image scanning system, a compensation value determining system that determines a compensation value which is used to make at least a position of a point in the predetermined number of lines of image data stored in the image storing system coincide with the reference position, and a compensating system that compensates the position of the predetermined number of lines of image data in accordance with the compensation value determined by the compensation value determining system.

19 Claims, 11 Drawing Sheets

IMAGE PROCESSING DEVICE

BACKGROUND OF THE INVENTION

The present invention relates to an image processing device capable of compensating for a shift of image caused by a shift of original during an image scanning operation.

Conventionally, as an image processing apparatus, an MFP (Multi-Functional Peripheral) having a facsimile function, a copier function, a PC scanning function and a network scanning function has been known. In such an MFP, an original feeder that automatically feeds original sheets is implemented. An image on the original is scanned by adjusting the sheet feed speed with the scanning speed. If a positional relationship between the scanning head and an original table changes slightly due to rattle of the scanning head when the original is fed and vibration occurs, the vibration affects the scanned image.

Japanese Patent Provisional Publication No. P2002-10039 discloses a compensating mechanism, in which a reference mark is formed on the original table to detect a shift of the scanning head with respect to the reference mark, and then, based on the shift as detected, the image data as scanned is compensated.

However, in the above-identified publication, it is assumed that the positional relationship between the original table and the original does not change, and based on the change of the positional relationship between the reference mark on the original table and the scanning head, the image data is compensated. Therefore, in a case where the user place, for example, a book as an original and holds it on the original table by the hand, and the position of the original (book) with respect to the original table is changed due to the vibration of the hands of the user, the scanned image is affected by the displacement of the original even if the compensation method disclosed in the publication is applied.

Incidentally, there is known an image processing device which scans an original on a unit bases. That is, in such a device, units image data consisting of a plurality of lines of image data are successively introduced in an input memory, then compensation processing is applied to the unit image data, which is then stored in a storage. After one unit image data is processed (introduced, compensated and stored), the input memory is released and subsequent unit image data is scanned and introduced. With such a configuration, the performance of the CPU can be relatively low, and the memory size can be saved.

FIG. 11 shows an example of the scanned image 100 which is scanned in accordance with the above-described method, and the original was shifted during scanning as the user's hand was moved. The positions where the shifts occurred in the obtained image are indicated by arrows.

As shown in FIG. 11, the shift of the scanned image appears in a discontinuous manner. If the scanning is performed line by line, the shift in the obtained image appears continuously. However, when the original image is scanned on a block basis, a relatively long time period is required when the input memory is released before the succeeding plurality of lines (i.e., a unit) of image is scanned. If the original is displaced during this relatively long period, the scanned image 100 contains discontinuous sifts in the scanned image as shown in FIG. 11. Such a discontinuous image is conspicuous, which deteriorates the quality of the scanned images.

SUMMARY OF THE INVENTION

The present invention is advantageous in that an improved image processing apparatus is provided, with which the shift of the scanned image caused by the shift of the original during the scanning operation is compensated for and thus scanned images having high quality can be obtained.

According to an aspect of the invention, there is provided an image processing device, which is provided with a reference position determining system that determines a reference position based on image data of an original, an image scanning system that scans the original line by line, the line extending in a main scanning direction, an image storing system that stores a predetermined number of lines of image data scanned by the image scanning system, a compensation value determining system that determines a compensation value which is used to make at least a position of a point in the predetermined number of lines of image data stored in the image storing system coincide with the reference position, and a compensating system that compensates the position of the predetermined number of lines of image data in accordance with the compensation value determined by the compensation value determining system.

Optionally, the image storing system may store the predetermined number of lines of image data as a unit image data, and the reference position determining system may determine a reference position corresponding to an n-th unit image data based on (n−1)-th unit image data stored in the image storing system and a compensation value corresponding to the (n−1)-th unit image data determined by the compensation value determining system.

Optionally, the image processing device may further include a pre-scanning system that roughly scans at least a part of the original prior to the scanning executed by the image scanning system, and the reference position determining system may determine the reference position based on the image data obtained by the pre-scanning system.

In a particular case, the image processing device may include a scanning stopping system that stops scanning the original when the compensation value does not satisfy a predetermined condition. Optionally, a multi-functional peripheral having at least one of a copier function and a facsimile transmission function.

In this case, the image processing device may further include a displaying system that displays that the scanning operation is stopped when the scanning stopping system stops scanning.

Still optionally, the image processing device may further include a scanning retrying system that retries to scan the original when the compensation value does not satisfy a predetermined condition. Optionally, the image processing device may be a multi-function peripheral connected with an external device, the image data being transmitted to and used by the external device.

In this case, the image processing device may further include a notifying system that notifies that the scanning is re-executed.

According to another aspect of the invention, there is provided an image processing device, which is provided with a scanning system that scans an original placed on an original table line by line, the line extending in the main scanning direction, an origin being defined as a point on the original table at a point on a boundary between an area the scanning system can san and another area the scanning system cannot scan, an image storing system that stores a unit image data consisting of a predetermined number of lines of image data, a first reference position determining system that determines a first reference position indicative of an end position of the original, with respect to the origin, within a first area defined in first unit data stored in the image storing system, a second reference position determining system that determines a second reference position indicative of an end position of the original, with respect to the origin, within a second area defined in second unit data successive to the first unit data and stored in the image storing system, a compensation value determining system that determines a compensation value for each unit data, the compensation value being used to make a position, in the main scanning direction, of the first reference position, and another position, in the main scanning direction, of the second reference position coincide with each other, and a compensating system that compensates for the position of the second unit data based on the compensation value determined by the compensation value determining system for the second unit data.

Optionally, the first area may be an area storing image data of a line located on a scanning end position within the first unit data, and the second area may be an area storing image data of a line located on a scanning end position within the second unit data.

Still optionally, the first reference position determining system may determine the first reference position as a position at which, within the first unit data, a difference of values of adjoining pixels exceeds a predetermined threshold value.

Further optionally, the second reference position determining system may determine the second reference position as a position at which, within the second unit data, a difference of values of adjoining pixels exceeds a predetermined threshold value.

Furthermore, the image processing device may further include a pre-scanning system that roughly scans at least a part of the original prior to the scanning executed by the image scanning system. The compensation value determining system may determine the compensation value in accordance with the image data obtained by the pre-scanning system.

Further optionally, the image processing device may further include a scanning stopping system that stops scanning the original when the compensation value does not satisfy a predetermined condition.

In this case, the image processing device may further include a displaying system that displays that the scanning operation is stopped when the scanning stopping system stops scanning.

Alternatively, the image processing device may be a multi-functional peripheral having at least one of a copier function and a facsimile transmission function.

Further, the image processing device may further include a scanning retrying system that retries to scan the original when the compensation value does not satisfy a predetermined condition.

In this case, the image processing device may further include a notifying system that notifies that the scanning is re-executed.

In a particular case, the image processing device may be a multi-function peripheral connected with an external device, the image data being transmitted to and used by the external device.

According to another aspect of the invention, there is provided a computer program product having computer readable instructions that cause a computer provided with a scanner to determine a reference position based on image data of an original, scan the original line by line, the line extending in a main scanning direction, store a predetermined number of lines of image data scanned by the scanner, determine a compensation value which is used to make at least a position of a point in the predetermined number of lines of image data as stored coincide with the reference position, and compensate for the position of the predetermined number of lines of image data in accordance with the compensation value as determined.

According to a further aspect of the invention, there is provided with a computer program product including computer readable instructions that cause a computer provided with a scanner to scan an original placed on an original table line by line, the line extending in the main scanning direction, an origin being defined as a point on the original table at a point on a boundary between an area the scanner can san and another area the scanner cannot scan, store a unit image data consisting of a predetermined number of lines of image data in a image storing system, determine a first reference position indicative of an end position of the original, with respect to the origin, within a first area defined in first unit data stored in the image storing system, determine a second reference position indicative of an end position of the original, with respect to the origin, within a second area defined in second unit data successive to the first unit data and stored in the image storing system, determine a compensation value for each unit data, the compensation value being used to make a position, in the main scanning direction, of the first reference position, and another position, in the main scanning direction, of the second reference position coincide with each other, and compensate for the position of the second unit data based on the compensation value determined by the compensation value determining system for the second unit data.

BRIEF DESCRIPTION OF THE ACCOMPANYING DRAWINGS

Figure 3:
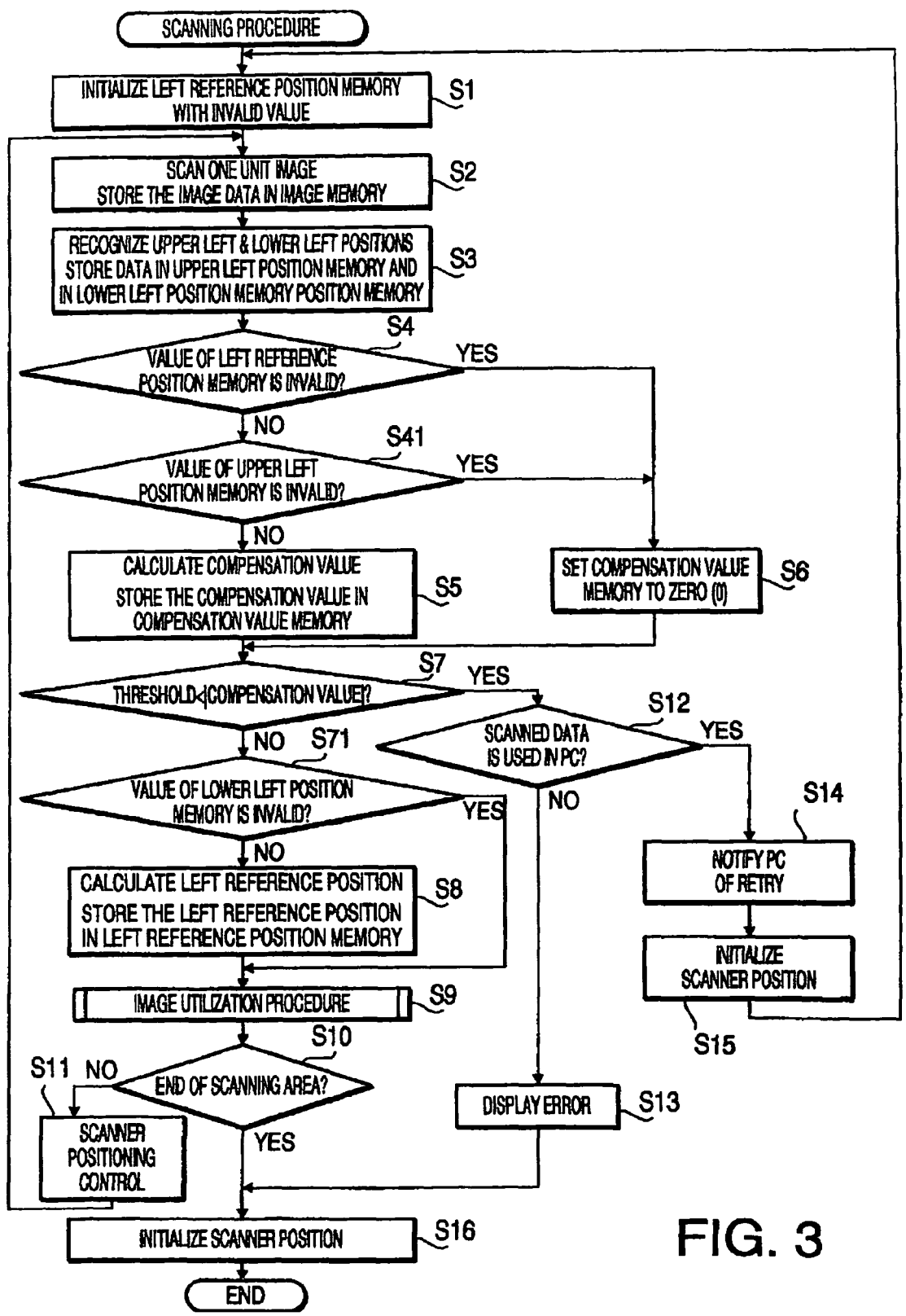
FIG. 3 shows a flowchart illustrating a scanning, procedure performed by the MFP.
Figure 4:
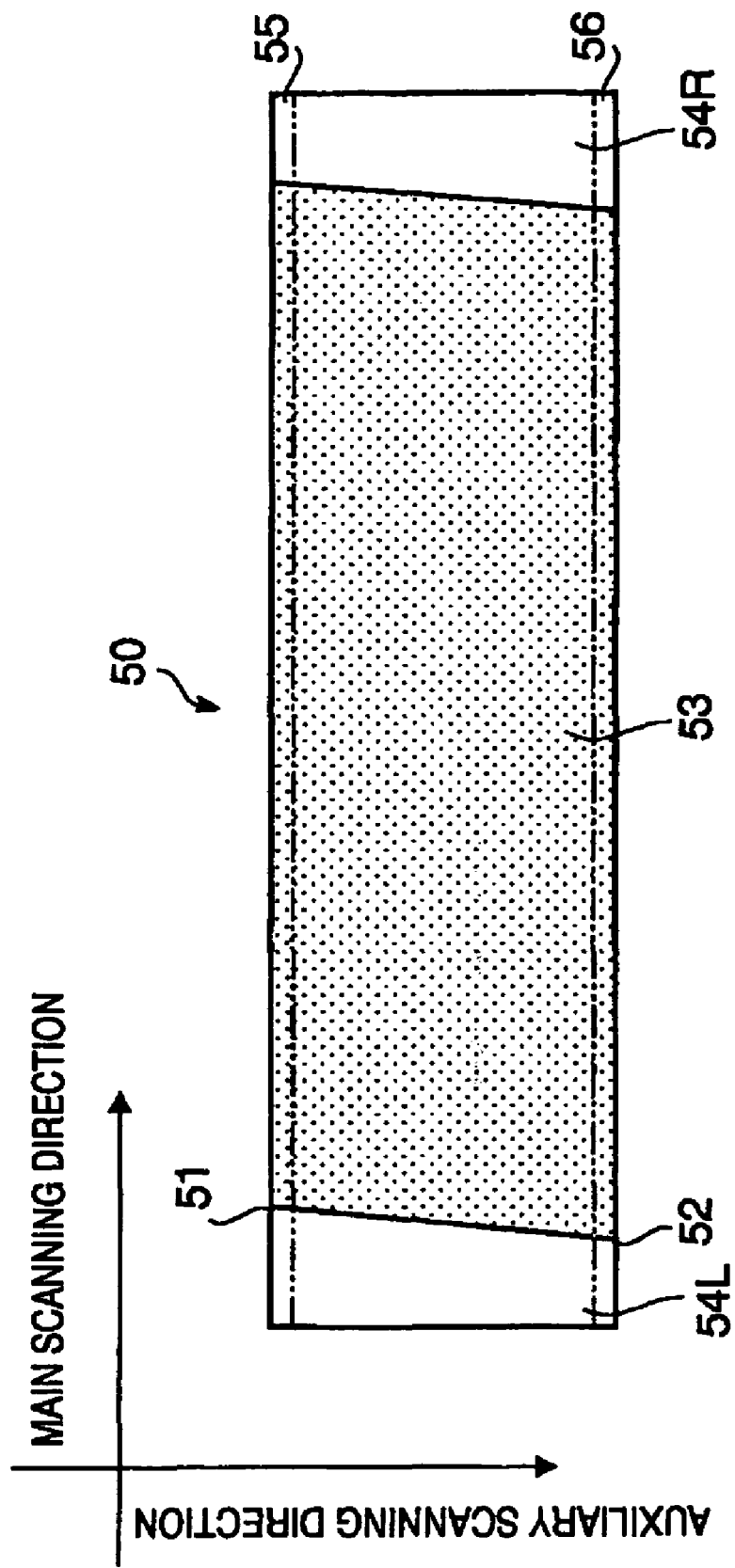
Figure 5:
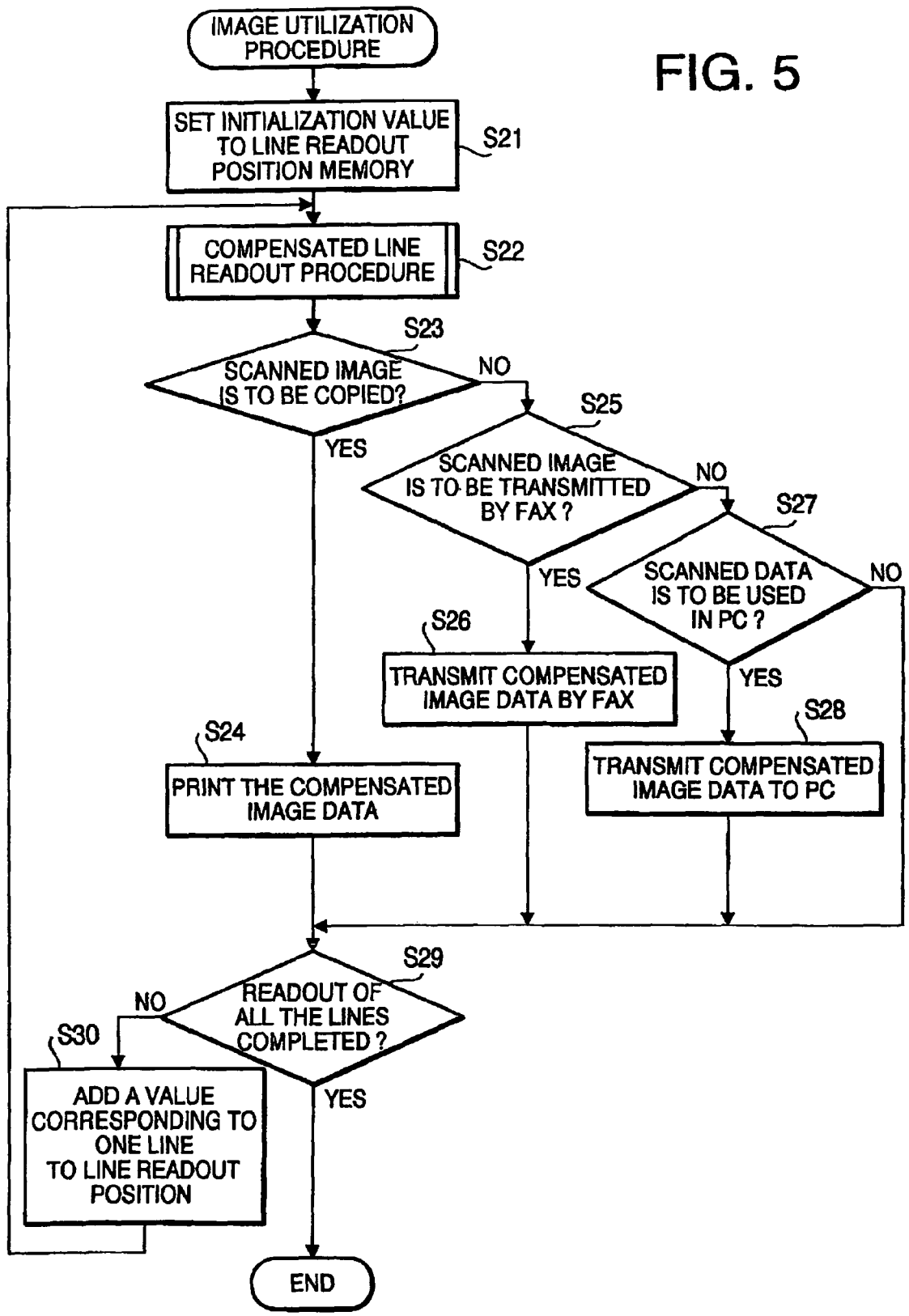
Figure 6:
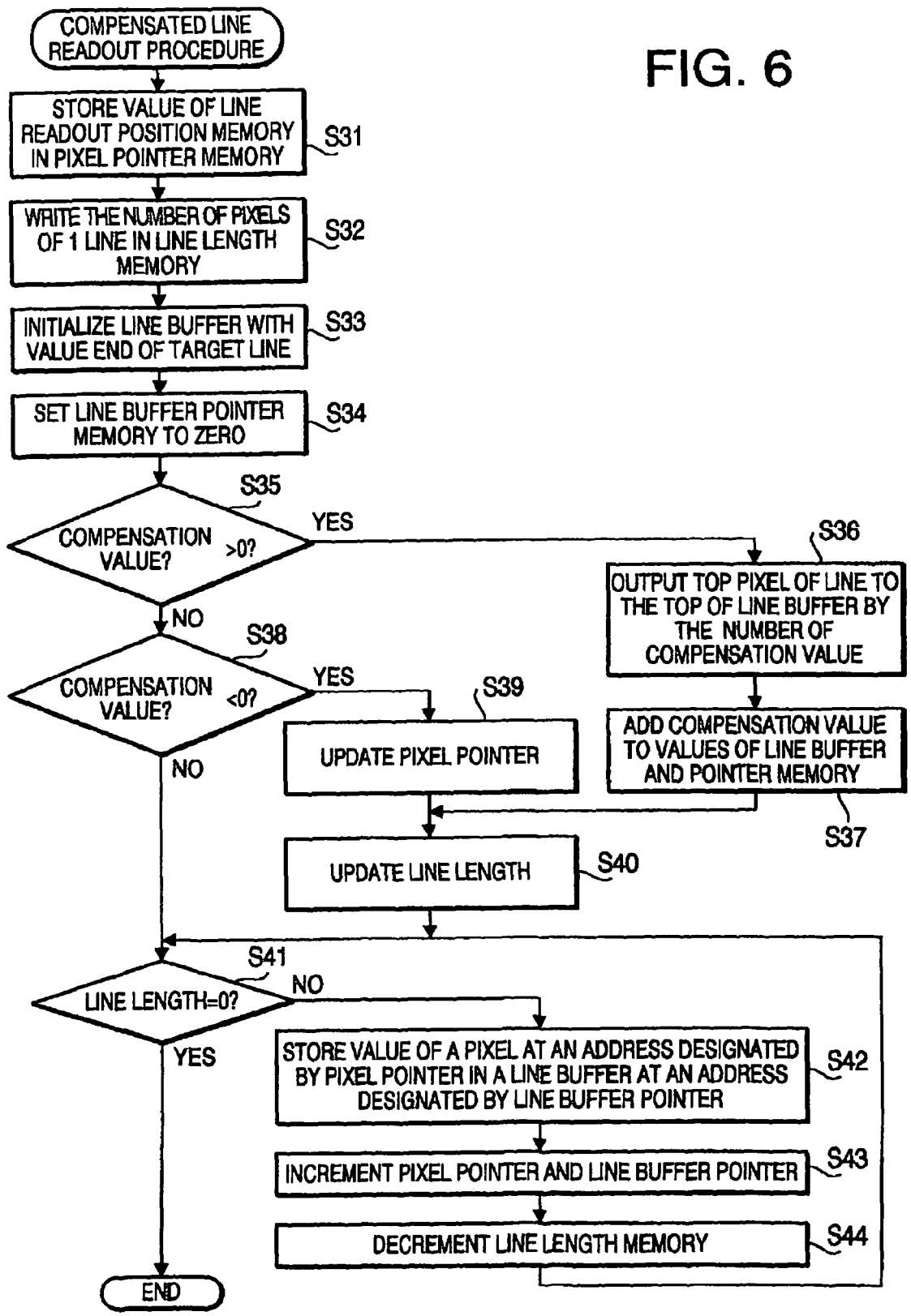
Figure 7:
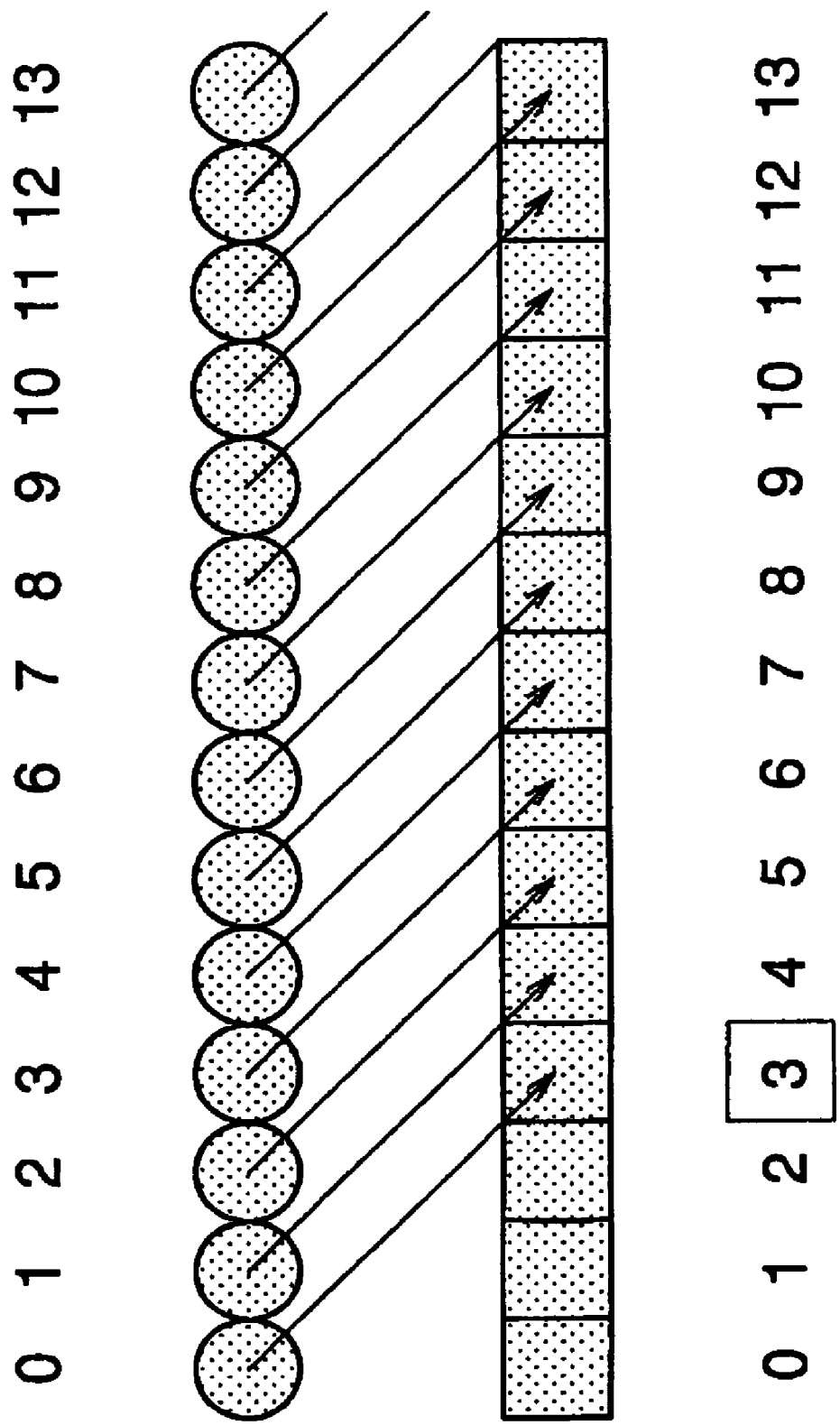
Figure 8:
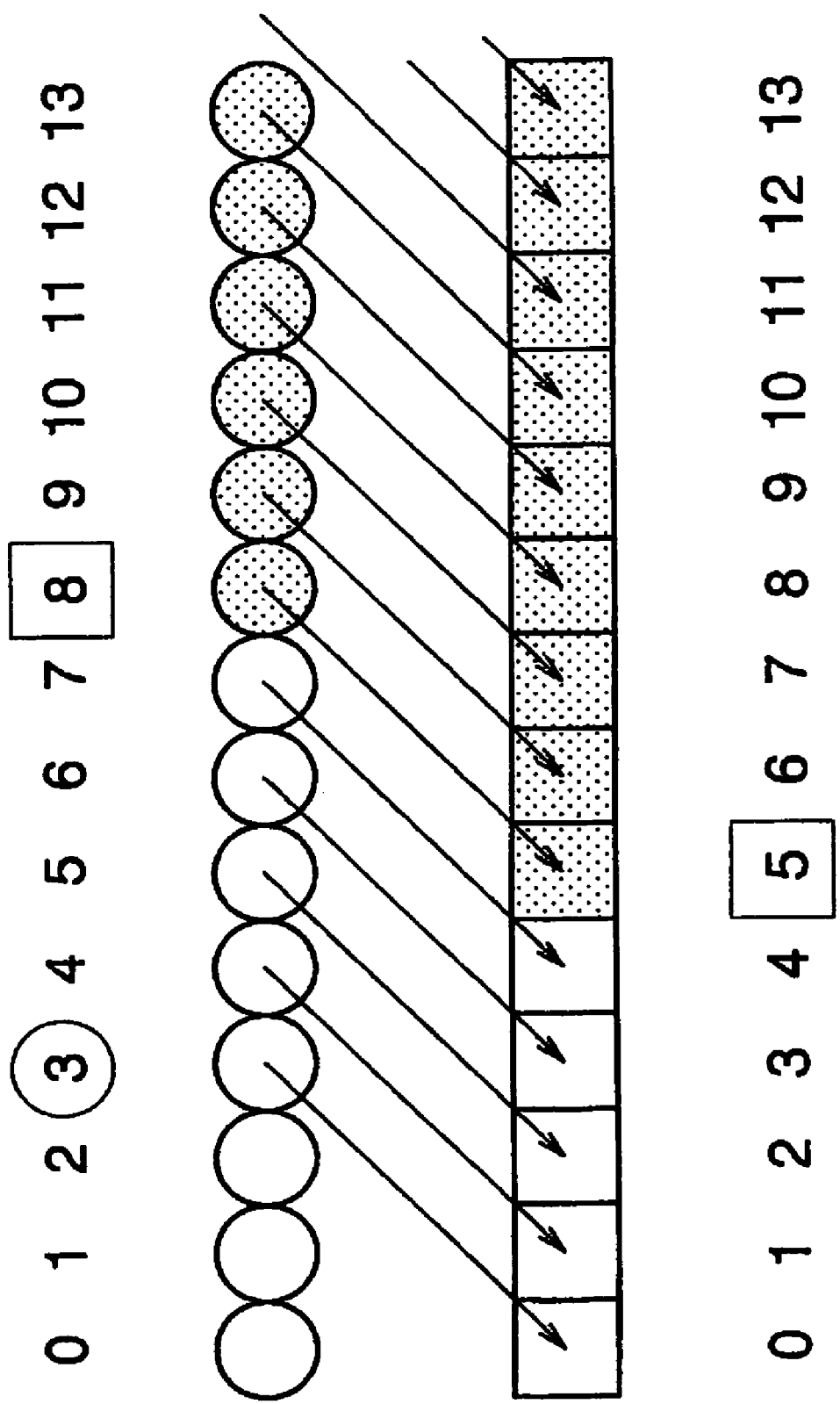
Figure 9:
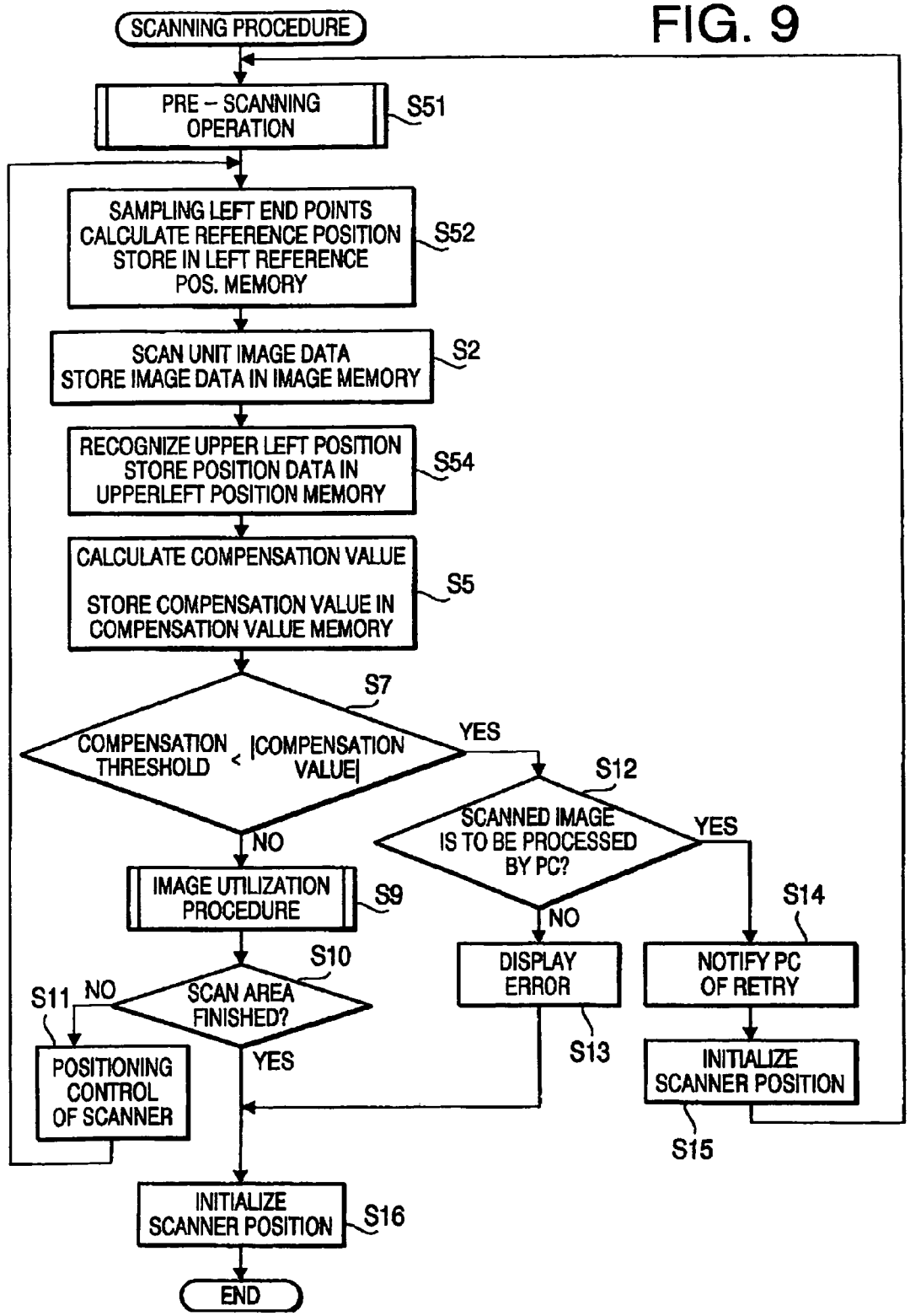
Figure 10:
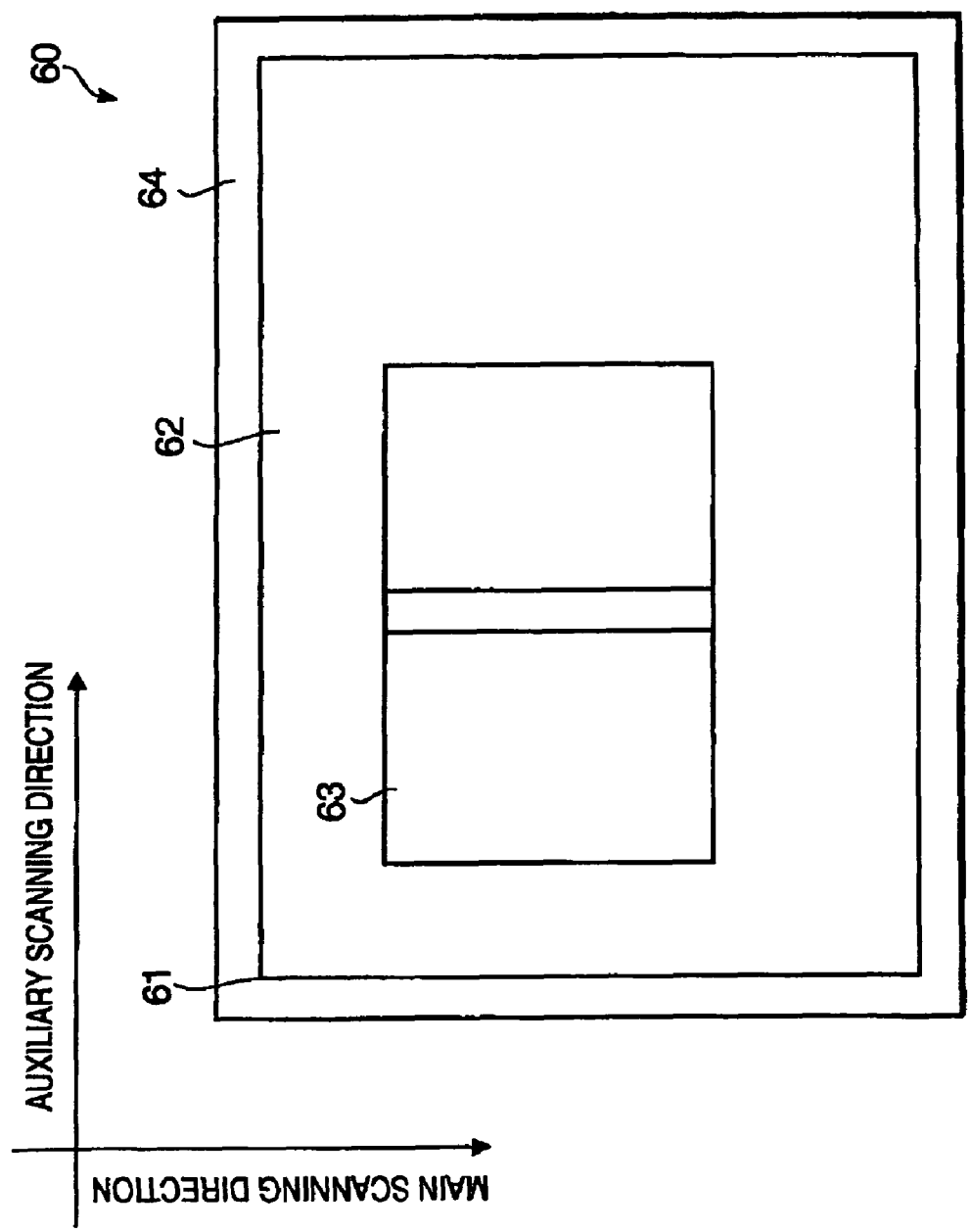
Figure 11:
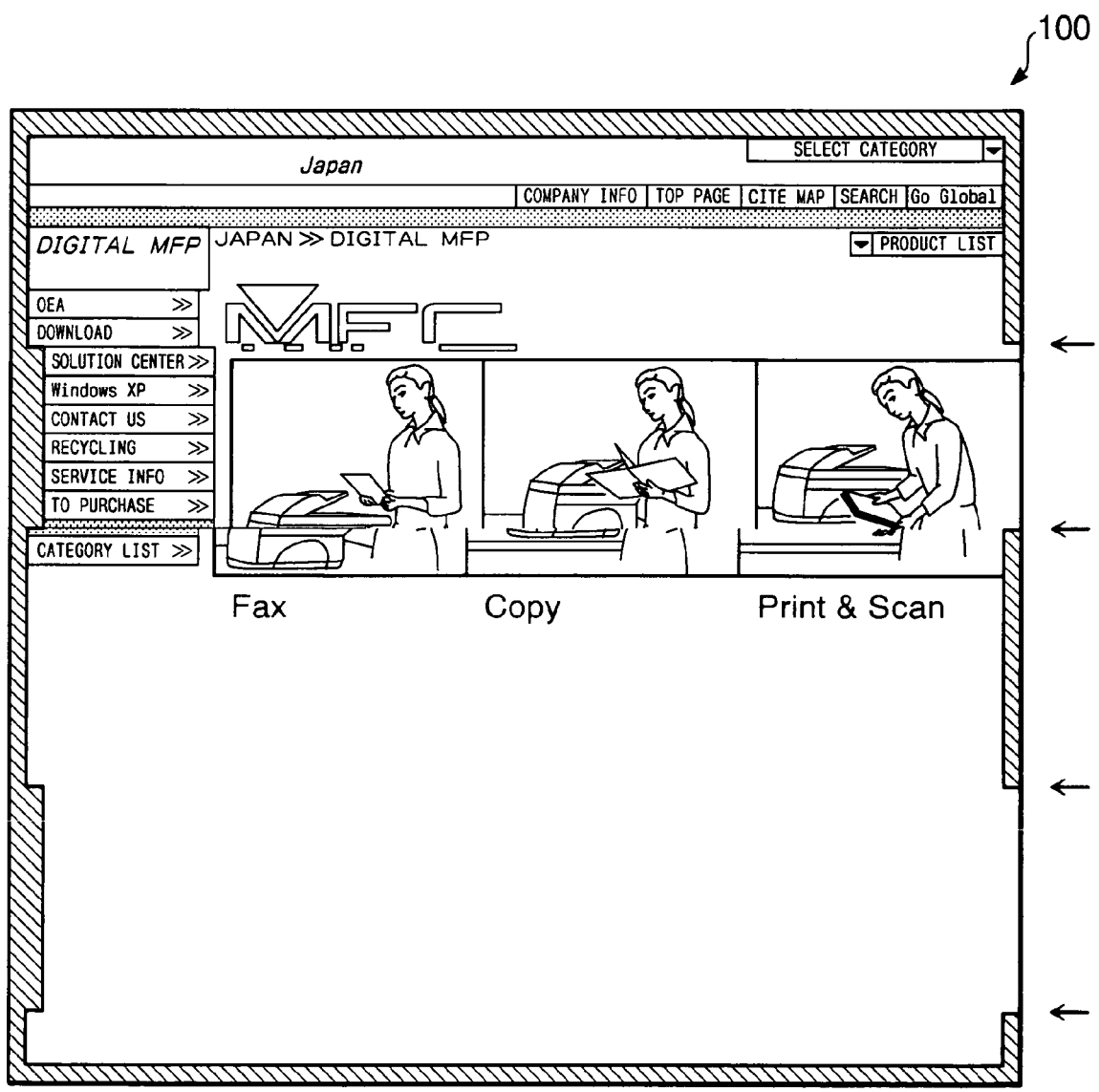

FIG. 4 schematically shows image data at n-th unit of the image scanned by the MFP (scanner);

FIG. 5 shows a flowchart illustrating image utilization procedure performed by the MFP;

FIG. 6 shows a flowchart illustrating a compensated line retrieving procedure performed by the MFP;

FIG. 7 schematically shows a relationship between a line to be scanned and a line buffer when the compensation value is positive;

FIG. 8 schematically shows a relationship between a line to be scanned and a line buffer when the compensation value is negative;

FIG. 9 shows a flowchart illustrating a scanning procedure which is a modification of that shown in FIG. 3;

FIG. 10 shows an original table viewed from the original side with the cover of the MFP being lifted; and FIG. 11 shows an example of a scanned image which is scanned in accordance with a conventional image scanning device and the user's hand was moved during the scanning operation.

DETAILED DESCRIPTION OF THE EMBODIMENT

Hereinafter, referring to the accompanying drawings an MFP (Multi-Functional Peripheral) 1 according to an embodiment of the invention will be described.

Figure 1:
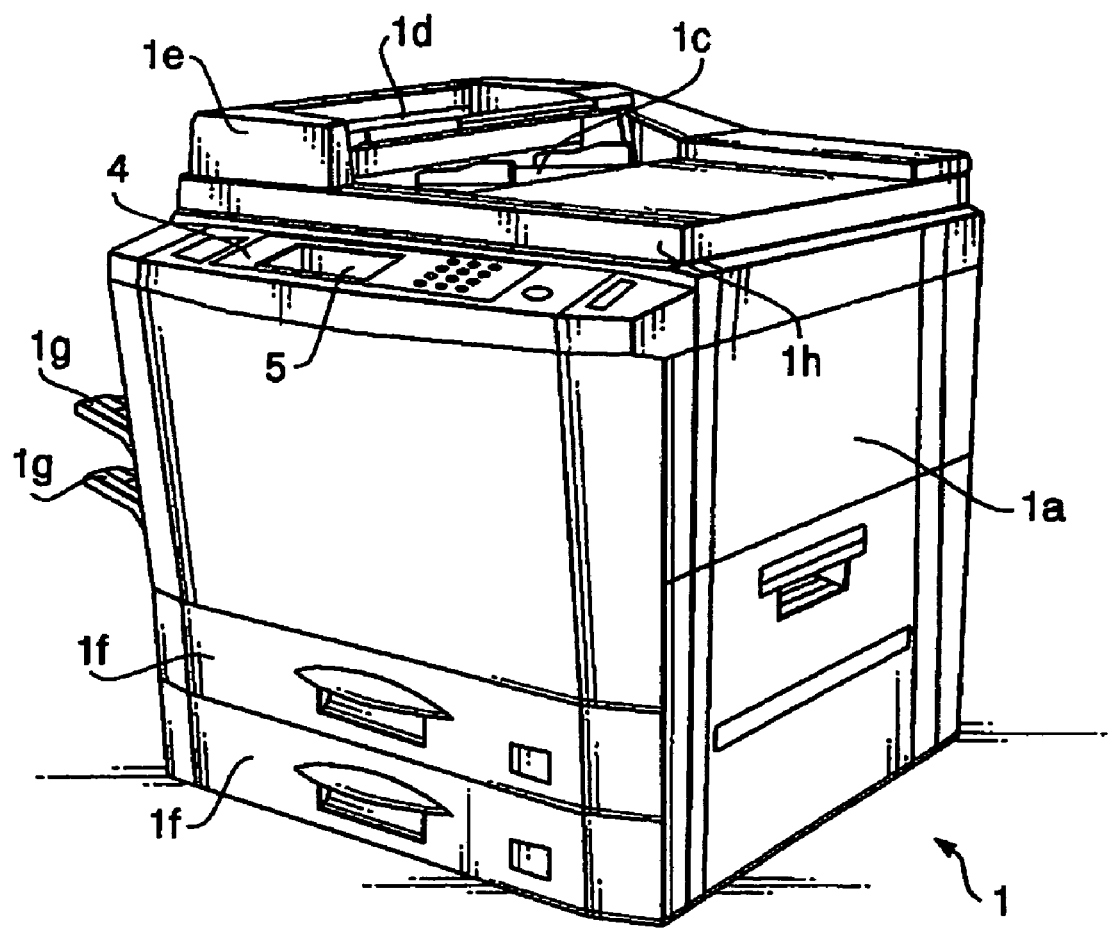
FIG. 1 is a perspective view of an MFP according to an embodiment of the present invention.

FIG. 1 shows a perspective view showing an appearance of the MFP 1 according to the embodiment. The MFP 1 shown in FIG. 1 is wire-connected to a public telephone line network (not shown) provided by a communication carrier through a telephone line. In this embodiment, the MFP 1 is configured to have a facsimile communication function for transmitting/receiving digitized image data, a scanner function for optically reading an original and creating digitized image data (scanned image), a copier function for scanning an image using the scanner function and forming the image on a recording medium, and a printer function for printing an image in accordance with print data transmitted from a personal computer (PC).

On an upper front portion of a main body 1a of the MFP 1, an operation panel 4 is provided. The operation panel 4 includes a plurality of command keys for inputting numerals/characters and an LCD (liquid crystal display) 5. The LCD 5 is a display for displaying an operation currently performed and a communication condition regarding a communication with a PC 35 connected with the MFP 1 or a communication with another device connected via a telephone line 26 (see FIG. 2). When the MFP 1 is operated through the command input keys provided on the operation panel 4, the operational status and operational procedures are displayed on the LCD 5. Further, a touch panel is provided to the LCD 5. Command input buttons are displayed on the LCD 5, and a user can input commands by touching the command input buttons through the touch panel.

On a top surface of the main body 1a, an original feeder 1e having an original inlet 1c and an original outlet 1d is provided. The original to be copied is inserted from the original inlet 1c with its image carrying surface directed downward. The original inserted in the original inlet 1c is fed, by the original feeder 1e, to the image scanning unit of the MFP 1. After the image formed on the original is scanned by a scanner (e.g., CCD line sensor) 22 provided inside the MFP 1, the original is discharged from the original outlet 1d.

The cover 1h of the upper surface of the main body 1a is rotatably supported at its rear side. FIG. 10 schematically shows inside the MFP 1 from the portion where the original (e.g., a book) 63 is to be placed (i.e., from the upper side) with the cover h being lifted. The original table 60 has a glass plate 62, which is fixed to cover the upper surface of the main body 1a.

At the periphery of the glass plate 62, a frame member 64 is provided. Under the glass plate 62, the scanner 22 that scans the image on the original 63 that is placed on the glass plate 62 is located. The scanner 22 is an elongated image scanning device and is configured such that the front-rear direction (up-and-down direction in FIG. 10) is its extending direction, which is a main scanning direction. The scanner 22 moves, below the glass plate 62, in the right-and-left hand side direction (in FIG. 10) of the main body 1a (i.e., the auxiliary scanning direction) to scan the original 63 placed on the glass plate 62. Thus, on the original table 60, an area formed by the glass plate 62 is an image scannable area, while the area where the frame member 64 is located is an unscannable area.

A point on the boundary between the glass plate 62 and the frame member 64 which is a starting point of the scanning operation, and located on the rear side of the main body 1a is referred to as an origin 61. Among the necessary image pixels of the image data, which will be referred to later, a position on the upper left of the necessary image pixels, and a position on the lower left of the necessary image pixels are defined as positions corresponding to the origin 61.

At a lower portion of the main body 1a, a sheet feed trays 1f which mount a plurality of types of recording sheets, and is configured to drawable with respect to the main body 1a are provided. From the sheet feed trays 1f, a recording sheet on which the scanned image is printed, is supplied inside the main body 1a as a sheet feed motor is driven. The recording sheet on which the image is printed is discharged from the main body 1a through recording sheet outlets 1g formed on the side surface of the MFP 1.

Figure 2:
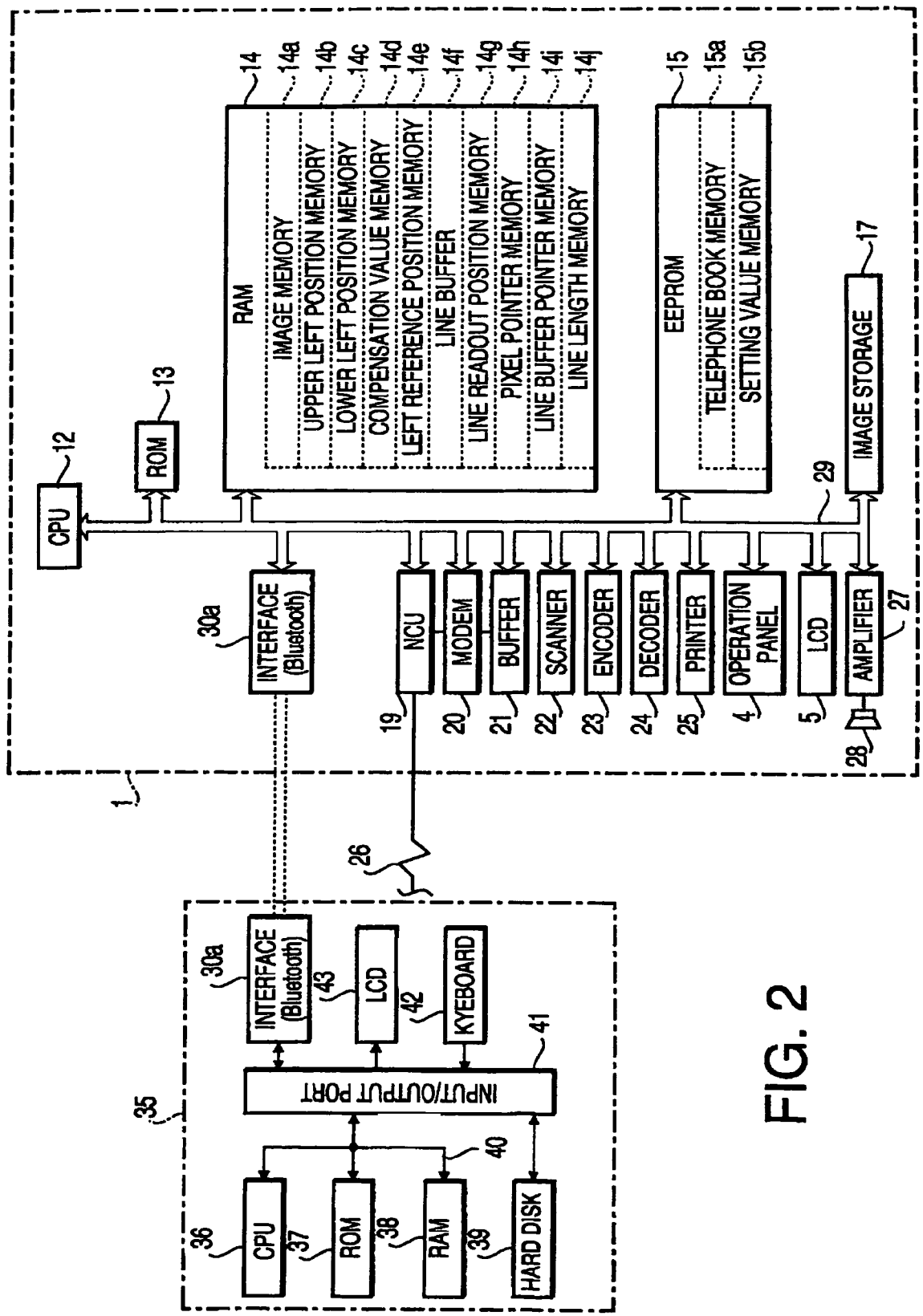
FIG. 2 is a block diagram showing an electrical configuration of the MFP and external device.

FIG. 2 is a block diagram showing an electric configuration of the PFP 1 and the PC 35.

As shown in FIG. 2, the MFP 1 has a CPU 12, a ROM 13, a RAM 14, an EEPROM 15, an image storage 17, a network control unit (NCU) 19, a modem 20, a buffer 21, the scanner 22, an encoder 23, a decoder 24, a printer 25, the operational panel 4, the LCD 5, an amplifier 27 and an interface 30a, which are interconnected through a bus line 29.

The NCU 19 is for the line control, and the MFP 1 is connected to the telephone line 26 through the NCU 19. The NCU 19 receives the ringing tone signal and various other signals transmitted from an exchanger through the telephone line 26. The NCU 19 further operates to transmit dialing signals corresponding to the operation through the input keys of the operation panel 4. When the telephone line 26 is closed (i.e., the connection is established), the NCU 19 can also operate to transmit/receive facsimile data.

The CPU 12 executes the facsimile transmission operation, printing operation and the like by controlling respective components connected to the bus line 29, in accordance with the signals transmitted through the NCU 19. The ROM 13 is a non-volatile read-only memory storing control programs to be executed by the MFP 1. It should be noted that the procedures shown in FIGS. 3, 5 and 6 are stored in the ROM 13 as programs to be executed by the CPU 12.

The control programs are for controlling various operations performed by the MFP 1, which include the facsimile transmission operation, printing operation and data communication between the MFP 1 and the PC 35. In particular, the control programs include programs of the scanning procedure described later, image utilization procedure and compensated line retrieval procedure.

The RAM 14 is a memory for temporarily storing various data during the procedures of the MFP 1 are performed. The RAM 14 includes an image storing memory 14a, a upper left position memory 14b, a lower left position memory 14c, a compensation memory 14d, a left reference position memory 14e, a line buffer 14f, a line retrieving position memory 14g, an image pointer memory 14h, a line buffer pointer memory 14i and a line length memory 14j.

The image memory 14a is a memory for temporarily storing a predetermined number of (e.g., 50) lines of image data scanned using the scanner 22 as unit (e.g., one block) image data. When the image utilization procedure shown in FIG. 5 has been applied to the image data stored in the image memory 14a, the image data of the succeeding unit image data is retrieved into the image memory 14a and the image utilization procedure is applied to the newly introduced image data.

The upper left position memory 14b stores an upper left position, in the main scanning direction and with respect to the origin 61, of the necessary pixels of the one unit image data stored in the image memory 14a. The lower left position memory 14c stores a lower left position, in the main scanning direction and with respect to the origin 61, of the necessary pixels of the one unit image data stored in the image memory 14a.

FIG. 4 schematically shows the scanned image including the upper left position data and lower left position data. In FIG. 4, 50 denotes the n-th unit image data. The n-th unit image data 50 includes the necessary pixel portion 53, and marginal portions 54R and 54L.

As the CPU 12 executes a control program stored in the ROM 13, pixels on the scanning start line 55 among the n-th unit image data 50 stored in the image memory 14a are examined along the main scanning direction, from the origin 61, thereby the CPU 12 recognizes the boundary between the marginal portion 54L and the necessary pixel portion 53 (i.e., the upper left position 51 of the necessary pixel portion 53) and stores the upper left position 51 with respect to the origin 61 in the upper left position memory 14b.

Pixels on the scanning end line 56 of the n-th unit image data 50 stored in the image memory 14a are also examined along the main scanning direction, from the origin 61, thereby the CPU 12 recognizes the boundary between the marginal portion 54L and the necessary pixel portion 53 (i.e., the lower left position 52 of the necessary pixel portion 53) and stores the lower left position 52 with respect to the origin 61 in the lower left position memory 14c.

When a relatively thick original is to be scanned, the original is placed on the original table, and is held by hand during the scanning operation without closing the cover 1h. When the scanning is performed in such a manner, areas where the original 63 is located reflects light illuminating the original 63 and thus the value of the pixel corresponding to the original 63 is relatively large, while areas where the original 63 does not exist transmits the illumination light (i.e., does not reflect the light for illuminating the object 63) and thus the values of the pixels corresponding to the marginal portions 54R and 54L become relatively low. When the minimum value of a difference of the values of adjoining RGB pixels exceeds, for example, a threshold value of 70 (when each pixel has a value ranging 0-255), the portion may be recognized as a position corresponding to the left side end of the original 63 (i.e., the end of the necessary pixel portion 53).

The compensation value memory 14d stores a compensation value calculated for each unit image data in order to make the location, in the main scanning direction, of the upper left position 51 of the n-th unit image data coincide with a left reference position (which will be described later). In the compensation value memory 14d, zero (0) is written when the procedure shown in FIG. 3 is started. The value of the compensation value memory 14d is then updated using a value, which is calculated by subtracting the value stored in the upper left position memory 14b from the value stored in the left reference position memory 14e.

The left reference position memory 14e stores a lower left position, in the main scanning direction, of the (n−1)-th image data and the left reference position of the n-th image data is determined in accordance with the compensation value with respect to the (n−1)-th image data. When the image scanning operation is started, an invalid value such as (−1) is written in the left reference position memory 14e as an initial value.

A sum of a value stored in the lower left memory 14c and a value stored in the compensation value memory 14d is written in the left reference position memory 14e. By adding the compensation value for the (n−1)-th image data to the value representing the lower left position of the (n−1)-th image data, the left reference position for the n-th image data is determined. Therefore, by the compensated line retrieval procedure shown in FIG. 6, the lower left position of the necessary pixel portion 53 of the (n−1)-th image data and the upper left position of the necessary pixels of the n-th image data are made coincide with each other.

The line buffer 14f is a buffer that stores a line of compensated image data retrieved from the image memory 14a. In the compensated line retrieval procedure shown in FIG. 6, a line of image data is retrieved from the image memory 14a based on the compensation value stored in the compensation value memory 14d and then stored in the line buffer 14f. The compensated line image stored in the line buffer 14f is subjected to the print operation, facsimile transmitting operation or transferring operation to the PC 35, and then, the next line of image data is introduced into the line buffer 14f.

The line scanning position memory 14g stores a top address of the target line from among the unit image data stored in the image memory 14a. The line scanning position memory 14g is set to zero (0), which is an initial value, when the image utilization procedure shown in FIG. 5 is started. After the procedure is applied to a line of image data, a value corresponding to the processed line is added and thereby updated. That is, in the line scanning position memory 14g, the top address of the next line is always stored.

The pixel pointer memory 14h is a pointer memory that stores the position of the target line to be read in the compensated line retrieval procedure shown in FIG. 6. In the pixel pointer memory 14h, from among the image data of the target line, the value of a k-th pixel is stored in the line buffer 14f, where k is the value stored in the pixel pointer memory 14h. The line buffer pointer memory 14i is a pointer memory that indicates the position of line image stored in the line buffer 14f. The image data of the target line is stored in m-th line buffer 14f, m being the value stored in the line buffer pointer memory 14i.

When the compensated line retrieval procedure shown in FIG. 6 is started, the pixel pointer memory 14h stores the value of the line scanning position memory 14g, that is, the top address of the target line. In the line buffer pointer memory 14i, zero (0) is stored. Every time when a pixel value of the target line is stored in the line buffer 14f, the pixel pointer memory 14h and the line buffer pointer memory 14i are incremented by one (1), respectively.

The line length memory 14j stores the number of pixels of one line which is scanned by the scanner 22. In the line length memory 14j, a predetermined number (e.g., 2400) of pixels preliminarily stored in the ROM 13 is written when the compensated line retrieval procedure shown in FIG. 6 is started. Every time when the value of a pixel of the image data of the target line is stored in the line buffer 14f, the line length memory 14j is decremented by one (1).

The EEPROM 15 is a rewritable non-volatile memory. The data stored in the EEPROM 15 is retained after the EEPROM 15 is powered off. The EEPROM 15 typically stores various data and setting values set/registered by an operator. In this example, the EEPROM 15 includes a telephone book memory 15a and setting value memory 15b. The MFP 1 is configured such that, by a predetermined operation, a data input screen for allowing the operator to input various data and setting values is displayed on the LCD 5. The data/settings input through the input screen are stored in the telephone book memory 15a and the setting value memory 15b.

The telephone book memory 15a stores facsimile numbers of destination facsimile devices. The data stored in the telephone book memory 15a is retrieved when the facsimile transmitting operation is executed.

The setting value memory 15b generally stores setting values necessary when the wireless communication is performed between the MFP 1 and the PC 35. The data communication between the MFP 1 and the PC 35 is executed wirelessly, using electromagnetic wave. Therefore, a security measure for preventing eavesdropping is necessary. That is, when the wireless communication is executed, it is set that the communication can be performed only between the MFP 1 and the PC 35. Setting values for this restricted communication are stored in the setting value memory 15b. When the wireless communication is performed, the setting values stored in the setting value memory 15b are referred to.

Specifically, the setting values stored in the setting value memory 15b include channels of the interfaces 30a and 30c, and Extended Service Set IDs (hereinafter, simply referred to as ESSID). The channel is a path of data, which is invisible, and when the mutual communication is achieved, the interfaces 30a and 30c are set to use the same channel. Therefore, the channel of the PFM 1 and that of the PC 35 are set to the same channel, and the value is stored as the set value in the setting value memory 15b. In the wireless network system, the ESSID is a character string to be used for identifying individual network. The ESSID is set by the user, and assigned to each device.

The image storage 17 is for storing the entire image data. In the embodiment, the image storage 17 is constituted by a DRAM having a large capacity. In the MFP 1, when the facsimile data is received, it is temporarily stored in the image storage 17, and then, when the printer 25 can operate to print, transmitted to the printer 25. After printer by the printer 25, the facsimile data store din the image storage 17 is deleted. When the facsimile data is the image data, the size is generally large. However, the facsimile data is deleted when it is printed out. Therefore, the capacity of the image storage 17 is efficiently utilized. Further, in the image storage 17, the image data input through the PC 35 is also stored as image data files. In this case, the image data files are remained in the image memory, until a predetermined deleting operation is performed.

The modem 20 transmits/receives the image data as encoded/decoded data, and further transmits/receives various procedure signals for transmission control. The buffer 21 temporarily stores encoded facsimile data which is exchanged between another facsimile device.

The scanner 22 is for scanning the image of the originally inserted through the original inlet 1c. The encoder module 23 encodes the scanned image of the original read by the scanner 22. The decoder module 24 is for retrieving the received data stored in the buffer 21, and decodes the same. The decoded data is printed by the printer 25 on the recording sheet. The operation panel 4 is used for various operation such as the settings/operations of the MFP 1. The amplifier 27 amplifies audio signals input thereto to sound the speaker 28. For example, a ringing tone is output by the speaker.

The interfaces 30a and 30c are for connecting the MFP 1 and the PC 35. The interfaces 30a and 30c defines connection standards for data communication between different devices, and electrical configurations are defined thereby. According to the embodiment, the interfaces 30a and 30c employs a general use wireless communication standard know as Bluetooth. The Bluetooth is the interface utilizing the 2.45 GHz electromagnetic wave which can be used without license and allows the data communication at the speed of 1 Mbps. The Bluetooth requires a relatively low power consumption and manufacturing cost can be suppressed. Further, when a distance between the devices are 10 meters or smaller, the data communication can be performed even if there is an obstacle therebetween.

The PC 35 is a personal computer, and performs the data communication with the MFP 1. The PC 35 can transmits the data the PC 35 contains or input to the PC 35 to the MFP 1. Further, the PC 35 can receive the data transmitted from the MFP 1 and process the received data.

The PC 35 includes a CPU 36, a ROM 37, a RAM 38, a hard disk 39, an input/output port 41, a keyboard 42, an LCD 43 and an interface 30c, which are interconnected through a bus line 40.

The CPU 36 control each component connected through the bus line 40 based on the parameters stored in the ROM 37, transmitted/received by executing programs stored in the ROM 37 and/or transmitted/received signals through the interface 30c. The ROM 37 is a non-volatile non-rewritable memory and contains control programs to be executed in the PC 35. The RAM 38 is a memory for temporarily storing data.

The hard disk 39 is a non-volatile writable storage, and various data and programs, which may be installed when necessary, are stored therein. Specifically, programs stored in the hard disk 39 include programs for transmitting the data created in the PC 35 to the MFP 1, and programs for receiving and processing image data transmitted form the MFP 1.

The keyboard 42 is an input device provide with a plurality of keys, which are depressed and various alphanumeric characters assigned to respective keys are input. The input characters are displayed on the LCD 43.

The interface 30c complies with the same standard as that for the interface 30a of the MFP 1. Specifically, the interface 30c employs the Bluetooth standard. Through the interface 30c, the PC 35 is connected to the MFP 1, and the PC 35 can receive the image data from the MFP 1. The received data is stored in the RAM 38, and is displayed on the LCD 43 when a predetermined output operation is performed.

As shown in FIG. 2, the CPU 36, the ROM 37 and the RAM 38 are interconnected through the bus line 40, and the bus line 40 is connected to the input/output port 41. The input/output port 41 is also connected to the had disk 39, keyboard 42, LCD 43 and the interface 30c.

Next, operation of the MFP 1 will be described with reference to the flowcharts shown in FIGS. 3, 5 and 6.

FIG. 3 shows a scanning procedure which is executed when the copying operation or facsimile transmission operation is instructed through the operation panel 4, or image input operation is instructed from the PC 35.

In the scanning procedure shown in FIG. 3, the left reference position memory 14e is initialized such that an invalid value (e.g., −1) is stored therein (S1). Then, process moves the scanner 22 in the auxiliary scanning direction. In this case, starting from the origin 61 side (i.e., left-hand side in FIG. 1), a predetermined number (e.g., 50) of lines of image data is scanned and stored in the image memory 14a (S2).

Next, process examines the line 55 at the reading start position of the unit image data 50 stored in the image memory 14a, from the origin side (i.e., left-hand side in FIG. 4) to recognize the boundary of the necessary pixel portion 53 and the marginal portion 54L (i.e., the left-hand side end of the necessary pixel portion 53). Then, the position of the left-hand side end of the line 55, in the main scanning direction, is stored in the upper left position memory 14b. Next, process examines the line 56 at the scanning end position of the unit image data stored in the image memory 14a, from the origin side to recognize the boundary of the necessary pixel portion 53 and the marginal portion 54L. Then, the position of the left-hand side end of the line 56, in the main scanning direction, is stored in the lower left position memory 14c.

As aforementioned, the process recognizes the end of the original when the difference of the values of the adjoining pixels of the image data exceeds a predetermined threshold value which may be stored in the ROM 13. When the upper left position and/or lower left position are not recognized, invalid values are stored in the upper left position memory 14b and/or lower left position memory 14c (S3).

Next, process determines whether the value stored in the left reference position memory 14e is valid (S4). When S4 is executed first time, the invalid value is stored in the left reference position memory 14e (S4: YES), and process proceeds to S6 and stores value zero (0) in the compensation value memory 14d (S6). Next, process determines whether an absolute value of the compensation memory 14d exceeds the compensation threshold value stored in the ROM 13 (S7). Since the initial value of the compensation value memory 14d is zero (0) (S7: NO), if the value of the lower left memory 14c is not invalid (S71: No), a value of the lower left position memory 14c added with the value of the compensation value memory 14d is determined as the left reference position, and stored in the left reference position memory 14e (S8). When the value of the lower left position memory 14c is invalid (S71: YES), the left reference position memory 14e is not changed. It should be noted that, when step S71 is firstly executed, the value of the compensation value memory 14d is zero (0), and the value of the lower left position memory 14c is stored in the left reference position memory 14e.

Next, in the image utilization procedure described later, the unit image data scanned in S2 is used for printing, facsimile transmission or processing in the PC 35 (S9). Then, process determines whether the entire scanning area of the original 63 placed on the original table 60 has been scanned with the scanner 22 (S10). Since S2 is executed once, only 50 lines of image, from the origin 61, has been scanned (S10: NO). In S11, process controls the positioning of the scanner 22 in the auxiliary scanning direction in order to scan the next unit image data.

When process returns to S2 after S11, since the value of the left reference position memory 14e is not invalid (S4: NO), process proceeds to S41 to determine whether the value of the upper left position memory 14b is invalid. When the value is valid (S41: NO), process proceeds to S5 and calculates compensation value by subtracting the value of the upper left position memory 14b from the value of the left reference position memory 14e, which is stored in the compensation value memory 14d (S5). When the value of the upper left position memory 14b is invalid (S41: YES), no compensation is performed and process proceeds to S6.

When the first unit image data is retrieved, a value of the lower left position, in the main scanning direction, of the (n−1)-th image data is stored in the left reference position memory 14e. Therefore, lower left position, in the main scanning direction, of the first unit image data is used as the reference position, and the compensation value for the second unit image data is determined so that the upper left position, in the second unit image data, coincides with the reference position. In other wards, based on the lower left position of the (n−1)-th unit image data and compensation value for the (n−1)-th unit image data, the left reference position is determined, and the compensation value for the n-th image data is determined such that the upper left position, in the main scanning direction, of the n-th image data coincides with the left reference position.

If the original is shifted after the (n−1)-th unit image data has been scanned and before the n-th unit image data is scanned, a discontinuous shift appears on the scanned image 100 as shown in FIG. 11. The embodiment intends to compensate for such a discontinuous shift. However, if the shift is too much, it cannot be compensated for. Therefore, according to the embodiment, after the execution of S5 and S6, process determines whether the absolute value of the stored value of the compensation value memory 14d exceeds a compensation threshold value stored in the ROM 13 (S7). When the absolute value exceeds the compensation threshold value (S7: YES), process further determines whether the scanned image is to be used in the PC 35 (S12). When the scanned image is to be used in the PC 35 (S12: YES), process transmits data so that retry of scanning is indicated on the PC 35 side (S14). In S15, process initializes the scanner position 22 (i.e., moves the scanner 22 to it initial position: the origin 61 side position), and retries the scanning procedure.

When the scanned image is not used in the PC 35 (S12: NO), that is, when the scanned image is printed (copied) or transmitted by facsimile, an error display is made on the LCD 5 (S13), the scanner position is initialized (S16), and reading procedure is terminated. With this control, the user recognizes that the reading procedure is terminated due to the shift of the original, and restart the reading procedure again.

As described above, 50 lines of image data is obtained at each scanning, and when the scanning operation is finished for all the scanning area (S10: YES), the scanner 22 is returned to a predetermined position (initial position: on the origin 61 side of the original table 60) (S19), and the reading procedure is finished.

Next, image utilization procedure (S9 of FIG. 3) and compensated line retrieval procedure (S22 of FIG. 3) shown in FIGS. 5 and 6 will be described.

In S9 (FIG. 5), value zero (0) is written in the line readout position memory 14g (S21). Then, in S22, the compensated line retrieval procedure (FIG. 6) is executed.

In the compensated line retrieval procedure shown in FIG. 6, the value of the scanning start position memory 14g, which is the top address of the target line, is stored in the pixel pointer memory 14h (S31). When S31 is executed first time, the value of the line readout position memory 14g is zero (0). Therefore, zero is written in the pixel pointer memory 14h. Next, in the line length memory 14j, the number of pixels in one line (e.g., 2400), which is stored in the ROM 13, is written (S32). In the line buffer 14f, the value of the pixel located at the end of the target line (i.e., the right-hand end in FIG. 4) is stored (S33). As will be described later, when the image data is scanned with the scanner 22, if the left end of the original is shifted on the right side with respect to the left reference position (i.e., on the end side of the target line; right-hand side in FIG. 4), the shifted image data is retrieved, when stored in the line buffer 14f, with shifting the image data thereof on the left side (i.e., the starting end side of the target line: left-hand side of FIG. 4). For this purpose, the value of the end of the line buffer 14f is initialized with the value of the right side pixel of the line in advance. With this process, when the entire unit of image data is shifted leftward, the right side of the image of the original will not appear unnatural.

Next, process writes zero (0) in the line buffer pointer 14i (S34). Then, process determines whether the value of the compensated value memory 14d is greater than zero (0) (S35). When the value of the compensated value memory 14d is greater than zero (0) (S35: YES), that is, when the value of the left reference position memory is grater than the value of the upper left position memory and the upper left position of the unit image data is shifted leftward with respect to the left reference position (i.e., shifted on the starting position of the target line: left-hand side of FIG. 4), in the pixels of the line buffer 14f, by the same number of the value stored in the compensated value memory 14d, the value of the pixel at the top of the target line is stored (S36). Next, to the value of the line buffer pointer memory 14i, the value of the compensated value memory 14d is added (S37).

FIG. 7 shows a relationship between the target line and the line buffer 14f when the compensation value is positive. The upper row represents the target line, and the lower row represents the line buffer 14f. For the sake of easy comprehension, it is assumed that the value of the pixel pointer is zero (0), the value stored in the left reference position memory 14e is three (3), and the value stored in the upper left position memory 14b is zero (0). In this case, the value of the compensated value memory 14d is 3 (=3−0) (S5). Then, from the top of the line buffer 14f, the value of the top of the target line is stored in the pixels, the number of which is equal to the compensation value. In the above case, in the first three pixels, the value of the top pixel of the target line is stored (S36). Then, the value of the line buffer pointer memory 14i is updated to 3 (=0+3) (S37).

In S42, which will be described later, the 0th pixel value of the target line is written in the third pixel of the line buffer 14f, and the values of the pixels of the target line are written in the line buffer 14f with being shifted by three pixels. Therefore, with this control, the image data of the target line can be retrieved into the line buffer 14 with shifting rightward.

Further, as shown in FIG. 7, by shifting the image data rightward, the pixels located at the end portion of the target line are truncated. Therefore, the target line is shorted by the amount equal to the absolute value of the compensation value when retrieved in the line buffer 14f. Accordingly, in order to lessen the values of the line length memory 14j by the same amount, after S37, the value of the line length memory 14j is updated by subtracting the absolute value of the compensation value memory 14d from the value of the line length memory 14j.

When the value of the compensation value memory 14d is zero (0) or negative (S35: NO), process determines whether the value of the compensation memory 14d is negative (S38). When the value of the compensation memory 14d is negative (S38: YES), that is, when the value of the left reference position memory 14d is smaller than the value of the upper left position memory, and the upper left position of the unit image data is shifted rightward with respect to the left reference position (i.e., on the end side of the target line: right-hand side of FIG. 4), process updates the pixel pointer memory 14h using the value of the pixel pointer memory 14h added with the absolute value of the compensation value memory 14d (S39).

FIG. 8 shows a relationship between the target line and the line buffer 14f when the compensation value is negative. Similar to FIG. 7, the upper row represents the target line, and the lower row represents the line buffer 14f. For the sake of easy comprehension, it is assumed that the value of the pixel pointer memory is zero (0), the value of the left reference position memory 14e is five (5), and the value of the upper left position memory 14d is eight (8).

In this example, the value of the compensation value memory 14d is −3 (=5−8) (S5). Further, the value of the pixel pointer memory 14h is updated to 3 (=0+|−3|) (S39). In S42, the third pixel value (which is indicated by the value of the pixel pointer memory 14h) of the target line is written in the 0th pixel of the liner buffer 14f. The value of the eighth pixel which corresponds to the upper left position, is stored in the fifth pixel, which is the left reference position, of the line buffer 14h. As a result, the target line is retrieved with being shifted leftward.

As shown in FIG. 8, since the image data is shifted leftward, the top pixels of the target line are truncated, and the target line is written in the line buffer 14f with its length being lessened by the amount equal to the absolute value of the compensation value. Therefore, in order to lessen the value of the line length memory 14j by the lessened amount, after S39, the value of the line length memory 14j is updated (S40) by subtracting the absolute value of the compensation memory 14d from the value of the line length memory 14j. In this case, in the right side end portions of the line buffer 14f, the value of the end pixel of the target line is stored in S33, even though the image data of the target line is shifted leftward, the end portion of the line buffer 14f will not appear unnatural.

After S40 is executed, or when the compensation value is zero (0) (S38: NO), process determines whether the value of the line length memory 14j is zero (0) (S41). Since at the first time the value is not zero (S41: NO), process writes the value of the pixel whose address is indicated by the value of the pixel pointer memory 14h in the pixel of the line buffer 14f, whose position is indicated by the value of the line buffer pointer memory 14i (S42). Next, both the values of the pixel pointer memory 14h and the line buffer pointer memory 14i are incremented by one (1) in S43. Next, the value of the line length memory 14j is decremented by one (S44).

As above, until the value of the line length memory becomes zero, the image data of the target line is retrieved into the line buffer 14f. When the value of the line length memory 14j is determined to be zero (S41: YES), the compensated lien retrieval procedure shown in FIG. 6 (S22) is finished.

Thereafter, process returns to the image utilization procedure shown in FIG. 5. In S23, process determines whether copy of the target image is instructed. When the copying procedure has been instructed (S23: YES), the image data retrieved in the line buffer 14f in the compensated line retrieval procedure shown in FIG. 6 is printed by the printer 22 (S24), and process proceeds to S29. When the copying operation has not been instructed (S23: NO), process determines whether transmission of the scanned image by facsimile has been instructed (S25). If the facsimile transmission has been instructed (S25: YES), a predetermined image processing is applied to the image data retrieved into the line buffer 14f in the scanned line retrieval procedure shown in FIG. 6 and then transmitted by facsimile (S26). Then, process proceeds to S29.

If the facsimile transmission has not been instructed (S25: NO), process determines whether an instruction that the scanned image is utilized in the PC 35 has been issued (S27). When the processing of the image in the PC 35 has been instructed (S27: YES), the image data retrieved in the line buffer 14f in the compensated line retrieval procedure shown in FIG. 6 is transferred to the PC 35 via the interfaces 30a and 30c (S28), and process proceeds to S29. When none of the copying operation, facsimile transmission operation and utilization in the PC 35 has been instructed (S27: NO), process proceeds to S29.

As above, when the image utilization procedure for the 50 lines of image data stored in the image memory 14a has been finished (S29: YES), the image utilization procedure shown in FIG. 5 has terminated.

According to the MFP 1 described above, a reference position is determined based on the image of the original, and a compensation value is determined so that at least a point of the unit image data stored in the image memory coincides with the reference position. Then, based on the compensation value, the unit image stored in the image memory 14a is compensated. Therefore, even if the original is shifted when the original is being scanned, the shift of the image included in the image data can be compensated, and the scanned image at high quality can be obtained.

According to the MFP 1 described above, the reference position corresponding to the n-th unit image data is determined based on the (n−1)-th unit image data and the compensation value corresponding to the (n−1)-th unit image data. Therefore, for example, a relatively long time interval exists between the scanning of the (n−1)-th unit image data and the n-th unit image data and the original is shifted during the interval, the shift is compensated on unit basis. Thus, a high quality scanning can be achieved.

According to the MFP 1 described above, when the compensation value is equal to or greater than a predetermined value, scanning of the image data is terminated, and the termination is notified by displaying an error message. That is, when the shift amount is relatively large and it cannot be well compensated, the use is notified that the scanning is terminated and should be retried. Accordingly, if the compensation is automatically performed, the compensated image has a sufficient quality, and if not, the user retries the scanning to obtain the image having a sufficient quality. In either case, the high-quality image can be obtained, and thus the reliability of the scanning operation is improved.

According to the MFP 1 described above, in a certain case, if the compensation value is equal to or greater than a predetermined value, the scanning is retried automatically. Therefore, by use of the MFP 1, a high-quality image can be obtained always.

As above, the invention is described with reference to the exemplary embodiment. It should be noted that the invention need not be limited to the configuration of the embodiment described above, and various modifications can be made without departing from the scope of the invention.

For example, in the above-described embodiment, the reference position corresponding to the n-th unit image data is determined based on the lower left position of the (n−1)-th unit image data and a compensation value for the (n−1)-th unit image data. However, the reference position may be determined in a different manner. Such a modification is illustrated in FIG. 9, which shows a flowchart of a reading procedure according to a modification of the above-described embodiment. Note that in FIG. 9, steps similar to those in FIG. 3, the same step numbers are given and description thereof is omitted.

In S51, prior to stored the image data of the original in the image storing memory, a pre-scanning operation is performed to roughly obtain the shape of the original. Next, a plurality of points at the left side end of the original are sampled, and statistics obtained from the coordinates of the sampled points, such as a maximum value, minimum value, or values obtained in accordance with a least-square method is written in the left reference position memory 14e. Thereafter, procedure similar to that of S2 in FIG. 3 is executed.

Next, the uppermost line (i.e., the upper line in the auxiliary scanning direction) of the image data stored in the image memory 14a is examined from its left side to determine the left end of the original (i.e., the boundary between the necessary portion 53 and the marginal section 54L). Then the position in the main scanning direction of the left end of the original is stored in the upper left position memory 14b f (S54). It should be noted that a portion where the difference of the values of adjoining pixels exceeds a predetermined value that is, for example, stored in the ROM 13 in advance, is recognized as the end of the original.

According to the modification, the reference position is determined based on the image data obtained by pre-scanning. Therefore, even if the original shifts during the main scanning operation, the image data can be compensated for based on the reference position preliminarily obtained, and a high-quality image can be obtained always.

In the above-described embodiment, the image memory 14a stores 50 lines of image data as a unit image. The number of lines need not be limited to this value, and another number of lines of image may be regarded as a unit image. In a particular case, the number may be one. Even in a case where the image is obtained line by line, it is possible to adjust the position of image to a reference position.

In the above-described embodiment and modification, the reference position is defined as a position on the left side of the original in the main scanning direction, and the position of the left side of the image is adjusted to the reference position. However, the invention need not be limited to such a configuration, and the reference position may be defined on the right side of the original, and the right side of the image may be adjusted with respect to the right-side reference position.

The present disclosure relates to the subject matter contained in Japanese Patent Application No. 2003-281056, filed on Jul. 28, 2003, which is expressly incorporated herein by reference in its entirety.

What is claimed is:

1. An image processing device, comprising:
   a reference position determining system that determines a reference position along only one edge of an original image in a main scanning direction based on image data of the original image;
   an image scanning system that scans the original image line by line, the line extending in the main scanning direction;
   an image storing system that stores a predetermined number of plural lines of image data scanned by the image scanning system;
   a compensation value determining system that determines a compensation value based on positions of points along only the one edge of the original image in the main scanning direction which is used to make at least a position of a point in the predetermined number of plural lines of image data stored in the image storing system coincide with the reference position; and
   a compensating system that compensates the position of the predetermined number of plural lines of image data in accordance with the compensation value determined by the compensation value determining system;
   wherein the image storing system stores the predetermined number of plural lines of image data as unit image data;
   wherein the reference position determining system determines a reference position corresponding to n-th unit image data based on (n−1)-th unit image data stored in the image storing system and a compensation value corresponding to the (n−1)-th unit image data determined by the compensation value determining system;
   wherein the reference position determining system determines a lower left position, in the main scanning direction, of first unit image data as a reference position corresponding to the first unit image data;
   wherein the compensation value determining system determines a compensation value for the n-th unit image data by subtracting a value corresponding to an upper left position, in the main scanning direction, of the n-th unit image data from a value corresponding to a lower left position, in the main scanning direction, of the (n−1)-th unit image data; and
   wherein the reference position determining system determines the reference position corresponding to the n-th unit image data by adding the compensation value for the n-th unit image data to a value corresponding to a lower left position, in the main scanning direction, of the n-th unit image data.

2. The image processing device according to claim 1, further comprising a pre-scanning system that roughly scans at least a part of the original image prior to the scanning executed by the image scanning system;
wherein the reference position determining system determines the reference position based on the image data obtained by the pre-scanning system.

3. The image processing device according to claim 1, further includes a scanning stopping system that stops scanning the original image when the compensation value does not satisfy a predetermined condition.

4. The image processing device according to claim 3, further includes a displaying system that displays that the scanning operation is stopped when the scanning stopping system stops scanning.

5. The image processing device according to claim 3, which is a multi-functional peripheral having at least one of a copier function and a facsimile transmission function.

6. The image processing device according to claim 1, further includes a scanning retrying system that retries to scan the original image when the compensation value does not satisfy a predetermined condition.

7. The image processing device according to claim 6, further includes a notifying system that notifies that the scanning is re-executed.

8. The image processing device according to claim 6, which is a multi-function peripheral connected with an external device, the image data being transmitted to and used by the external device.

9. An image processing device, comprising:
a scanning system that scans an original image placed on an original table line by line, the line extending in a main scanning direction, an origin being defined as a point on the original table at a point on a boundary between an area the scanning system can scan and another area the scanning system cannot scan;
an image storing system that stores unit image data consisting of a predetermined number of plural lines of image data;
a first reference position determining system that determines a first reference position indicative of a first end position on only one edge of the original image in a main scanning direction, with respect to the origin, within a first area defined in first unit image data stored in the image storing system;
a second reference position determining system that determines a second reference position indicative of a second end position on only the one edge of the original image in a main scanning direction, with respect to the origin, within a second area defined in second unit image data successive to the first unit image data and stored in the image storing system;
a compensation value determining system that determines a compensation value based on positions along only the one edge of the original image in the main scanning direction for each unit image data, the compensation value being used to make a position, in the main scanning direction, of the first reference position, and another position, in the main scanning direction, of the second reference position coincide with each other; and
a compensating system that compensates for the position of the second unit image data based on the compensation value determined by the compensation value determining system for the second unit image data;

wherein the first area is an area storing image data of a line located on a scanning end position within the first unit image data;
wherein the second area is an area storing image data of a line located on a scanning end position within the second unit image data;
wherein the first reference position determining system determines the first reference position as a lower left position, in the main scanning direction, at which, within the first unit image data, a difference of values of adjoining pixels exceeds a predetermined threshold value;
wherein the second reference position determining system determines the second reference position as a position at which, within the second unit image data, a difference of values of adjoining pixels exceeds a predetermined threshold value;
wherein the compensation value determining system determines a compensation value for the second unit image data by subtracting a value corresponding to an upper left position, in the main scanning direction, of the second unit image data from a value corresponding to a lower left position, in the main scanning direction, of the first unit image data; and
herein the second reference position determining system determines the second reference position corresponding to the second unit image data by adding the compensation value for the second unit image data to a value corresponding to a lower left position, in the main scanning direction, of the second unit image data.

10. The image processing device according to claim 9, further comprising a pre-scanning system that roughly scans at least a part of the original image prior to the scanning executed by the image scanning system;
wherein the compensation value determining system determines the compensation value in accordance with the image data obtained by the pre-scanning system.

11. The image processing device according to claim 9, further including a scanning stopping system that stops scanning the original image when the compensation value does not satisfy a predetermined condition.

12. The image processing device according to claim 11, further including a displaying system that displays that the scanning operation is stopped when the scanning stopping system stops scanning.

13. The image processing device according to claim 11, which is a multi-functional peripheral having at least one of a copier function and a facsimile transmission function.

14. The image processing device according to claim 9, further including a scanning retrying system that retries to scan the original image when the compensation value does not satisfy a predetermined condition.

15. The image processing device according to claim 14, further including a notifying system that notifies that the scanning is re-executed.

16. The image processing device according to claim 14, which is a multi-function peripheral connected with an external device, the image data being transmitted to and used by the external device.

17. A computer-readable recording medium that stores a control program for controlling a computer provided with a scanner to:

determine a reference position along only one edge of an original image in a main scanning direction based on image data of the original image;

scan the original image line by line, the line extending in the main scanning direction;

store a predetermined number of plural lines of image data scanned by the scanner;

determine a compensation value based on positions of points along only the one edge of the original image in the main scanning direction which is used to make at least a position of a point in the predetermined number of plural lines of image data as stored coincide with the reference position; and compensate for the position of the predetermined number of plural lines of image data in accordance with the compensation value determined by the compensation value determining system;

wherein the image storing system stores the predetermined number of plural lines of image data as unit image data;

wherein the reference position determining system determines a reference position corresponding to n-th unit image data based on (n−1)-th unit image data stored in the image storing system and a compensation value corresponding to the (n−1)-th unit image data determined by the compensation value determining system;

wherein the reference position determining system determines a lower left position, in the main scanning direction, of first unit image data as a reference position corresponding to the first unit image data;

wherein the compensation value determining system determines a compensation value for the n-th unit image data by subtracting a value corresponding to an upper left position, in the main scanning direction, of the n-th unit image data from a value corresponding to a lower left position, in the main scanning direction, of the (n−1)-th unit image data; and wherein the reference position determining system determines the reference position corresponding to the n-th unit image data by adding the compensation value for the n-th unit image data to a value corresponding to a lower left position, in the main scanning direction, of the n-th unit image data.

18. A computer-readable recording medium that stores a control program for controlling a computer provided with a scanner to:

scan an original image placed on an original table line by line, the line extending in a main scanning direction, an origin being defined as a point on the original table at a point on a boundary between an area the scanner can san and another area the scanner cannot scan;

store unit image data consisting of a predetermined number of plural lines of image data in an image storing system;

determine a first reference position indicative of a first end position on only one edge of the original image in a main scanning direction, with respect to the origin, within a first area defined in first unit image data stored in the image storing system;

determine a second reference position indicative of a second end position on only the one edge of the original image in a main scanning direction, with respect to the origin, within a second area defined in second unit image data successive to the first unit image data and stored in the image storing system;

determine a compensation value based on positions along only the one edge of the original image in the main scanning direction for each unit image data, the compensation value being used to make a position, in the main scanning direction, of the first reference position, and another position, in the main scanning direction, of the second reference position coincide with each other; and compensate for the position of the second unit image data based on the compensation value determined by the compensation value determining system for the second unit image data, wherein the first area is an area storing image data of a line located on a scanning end position within the first unit image data;

wherein the second area is an area storing image data of a line located on a scanning end position within the second unit image data;

wherein the first reference position determining system determines the first reference position as a lower left position, in the main scanning direction, at which, within the first unit image data, a difference of values of adjoining pixels exceeds a predetermined threshold value;

wherein the second reference position determining system determines the second reference position as a position at which, within the second unit image data, a difference of values of adjoining pixels exceeds a predetermined threshold value;

wherein the compensation value determining system determines a compensation value for the second unit image data by subtracting a value corresponding to an upper left position, in the main scanning direction, of the second unit image data from a value corresponding to a lower left position, in the main scanning direction, of the first unit image data; and wherein the second reference position determining system determines the second reference position corresponding to the second unit image data by adding the compensation value for the second unit image data to a value corresponding to a lower left position, in the main scanning direction, of the second unit image data.

19. An image processing device, comprising:

a reference position determining system that determines a reference position along only one edge of an original image in a main scanning direction based on image data of the original image;

an image scanning system that scans the original image line by line, the line extending in the main scanning direction;

an image storing system that stores a predetermined number of plural lines of image data scanned by the image scanning system;

a compensation value determining system that determines a compensation value based on positions of points along only the one edge of the original image in the main scanning direction which is used to make at least a position of a point in the predetermined number of plural lines of image data stored in the image storing system coincide with the reference position; and a compensating system that compensates the position of the predetermined number of plural lines of image data in accordance with the compensation value determined by the compensation value determining system;

wherein the image storing system stores the predetermined number of plural lines of image data as unit image data;

wherein the reference position determining system determines a reference position corresponding to n-th unit image data based on (n−1)-th unit image data stored in the image storing system and a compensation value corresponding to the (n−1)-th unit image data determined by the compensation value determining system;

wherein the reference position determining system determines a lower right position, in the main scanning direction, of first unit image data as a reference position corresponding to the first unit image data;

wherein the compensation value determining system determines a compensation value for the n-th unit image data by subtracting a value corresponding to an upper right position, in the main scanning direction, of the n-th unit image data from a value corresponding to a lower right position, in the main scanning direction, of the (n−1)-th unit image data; and wherein the reference position determining system determines the reference position corresponding to the n-th unit image data by adding the compensation value for the n-th unit image data to a value corresponding to a lower right position, in the main scanning direction, of the n-th unit image data.

* * * * *